United States Patent
Chupp et al.

(10) Patent No.: US 6,283,622 B1
(45) Date of Patent: Sep. 4, 2001

(54) COMBINATION AUTOMOBILE HEAD REST MIRROR AND HARNESS ATTACHMENT MECHANISM

(76) Inventors: Michael W. Chupp; Roxie E. Mishler, both of 7565 W. Forest Ave., Warsaw, IN (US) 46580

( * ) Notice: Subject to any disclaimer, the term of this patent is extended or adjusted under 35 U.S.C. 154(b) by 0 days.

(21) Appl. No.: 08/936,454

(22) Filed: Sep. 24, 1997

(51) Int. Cl.$^7$ ..................................................... F21V 33/00
(52) U.S. Cl. ............................................. 362/492; 362/136
(58) Field of Search ..................................... 362/492, 136, 362/135, 138, 103, 488; 108/44

(56) References Cited

U.S. PATENT DOCUMENTS

| | | | |
|---|---|---|---|
| 4,681,366 | * 7/1987 | Lobanoff | 297/191 |
| 4,809,137 | 2/1989 | Yamada | 362/61 |
| 4,902,118 | * 2/1990 | Harris | 350/631 |
| 4,951,910 | 8/1990 | March | 248/311.2 |
| 5,285,321 | 2/1994 | Nolan-Brown | 359/857 |
| 5,361,169 | 11/1994 | Deal | 359/838 |
| 5,564,813 | * 10/1996 | Curtindale | 362/492 |
| 5,576,898 | 11/1996 | Rubin | 359/841 |
| 5,813,354 | * 9/1998 | Scott | 108/44 |

* cited by examiner

Primary Examiner—Nimeshkumar D. Patel
Assistant Examiner—Todd Reed Hopper
(74) Attorney, Agent, or Firm—John D. Gugliotta

(57) ABSTRACT

The present invention consists of a reflective surface and an easy open/close cover. The cover uses a simple closure device to hold it in place when the mirror is not in use. Also included is a battery-powered illumination system. An on/off/dimmer control switch lets the user to control the level of illumination. Using straps with an attached closure device, the harness is secured to the backside of a headrest.

9 Claims, 5 Drawing Sheets

US 6,283,622 B1

COMBINATION AUTOMOBILE HEAD REST MIRROR AND HARNESS ATTACHMENT MECHANISM

RELATED APPLICATIONS

The present invention is related to Disclosure Document Number 410,620 filed on Jan. 21, 1997.

BACKGROUND OF THE INVENTION

1. Field of the Invention

The present invention relates generally to portable mirrors and, more particularly, to a mirror and harness combination capable of being affixed safely to an automobile headrest.

2. Description of the Related Art

In the related art, many types and methods of mounting a mirror are known. Further, many of these types and methods have been associated with automobiles.

A search of the prior art did not disclose any patents that read directly on the claims of the instant invention; however, the following references were considered related:

| U.S. Pat. No. | Inventor | Issue Date |
| --- | --- | --- |
| 5,576,898 | Sheri J. Rubin | Nov. 19, 1996 |
| 5,361,169 | Jerry L. Deal | Nov. 1, 1994 |
| 5,285,321 | Patricia Nolan-Brown | Feb. 8, 1994 |
| 4,951,910 | William B. March | Aug. 28, 1990 |
| 4,902,118 | Sherryll Harris | Feb. 20, 1990 |
| 4,809,137 | Kiyoshi Yamada | Feb. 28, 1989 |

In U.S. Pat. No. 5,576, 898, an optical system for viewing the rear seat of a vehicle. Although mountable in the rear passenger compartment of a vehicle, such a device as disclosed would not function very affectively for use by the rear passenger's themselves in that the mounting mechanism includes overhead tracks.

Similarly, in U.S. Pat. No. 5,285,321, a device for observing an infant in a rear seat that again requires overhead attachment.

Again, in U.S. Pat. No. 4,902,118, an infant observation mirror for car travel is disclosed specifically adapted to attached to a rear seat and face forward.

While mirrors and affixments therefore are incorporated into this invention in combination, other elements are different enough as to make the combination distinguished over these and other related art. Consequently, a need has been felt for providing an apparatus and method which can secure a vanity mirror for a rear passenger in a useful, safe, secure, and portable manner.

SUMMARY OF THE INVENTION

It is therefore an object of the present invention to provide an improved optical viewing apparatus for back seat passengers in motor vehicles.

It is a feature of the present invention to provide a harness for attachment to a seat headrest in a detachable, adaptable manner.

Briefly described according the preferred embodiment, the present invention consists of a reflective surface and an easy open/close cover. The cover uses a simple closure device to hold it in place when the mirror is not in use. Also included is a battery-powered illumination system. An on/off/dimmer control switch lets the user to control the level of illumination. Using straps with an attached closure device, the harness is secured to the backside of a headrest.

An advantage of the present invention is that the mirror compartment holds a reflective surface, illumination device and associated electrical and hardware components, thereby providing multiple functionality.

Another advantage of the present invention is that a reflective surface provides viewing surface for backseat passengers.

Yet another advantage of the present invention includes a mirror cover for protecting reflective surfaces from scratches. Further, the mirror cover shields passengers from mirror surface in the event of an accident, is aesthetically pleasing in appearance, and allows the user to cover the mirror so they don't have to continually stare at their own reflection.

Finally, the straps provided secure the invention in place around the head rest and can be undone to remove invention.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
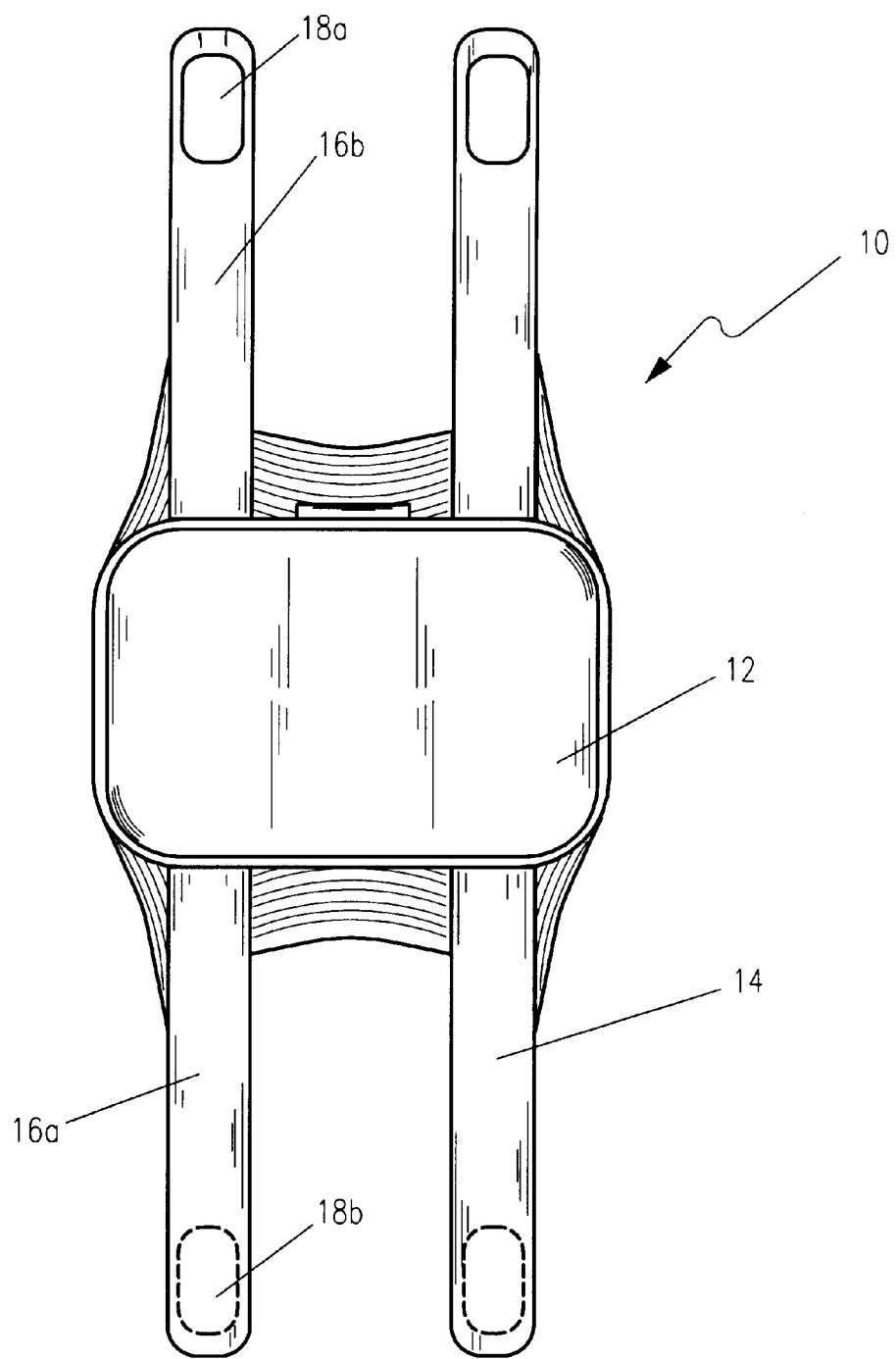
FIG. 1 is a front plan view of an automobile head rest mirror in combination with a harness attachment mechanism according to a first preferred embodiment of the present invention.

Referring now to FIG. 1, a combination automobile head rest mirror and harness attachment mechanism apparatus 10 is shown, according to the preferred embodiment of the present invention. A cover 12 is shown affixed to a harness 14 for attachment to a seat headrest in a detachable, adaptable manner. A plurality of opposed straps 16 are shown extending outward on the harness 14 away from the cover 12. An attachment means 18, herein depicted as a hook and loop fastener means comprising a hook fastener segment 18a and a loop fastener segment 18b. It is envisioned that the straps 16 are of a sufficient length as to be able to encompass and contain the headrest portion of an automobile vehicle seat. It is envisioned that a pair of long straps 16a and a pair of short straps 16b will be used, as described below. Using these straps 16, the harness 14 is secured to the backside of a headrest.

Figure 2:
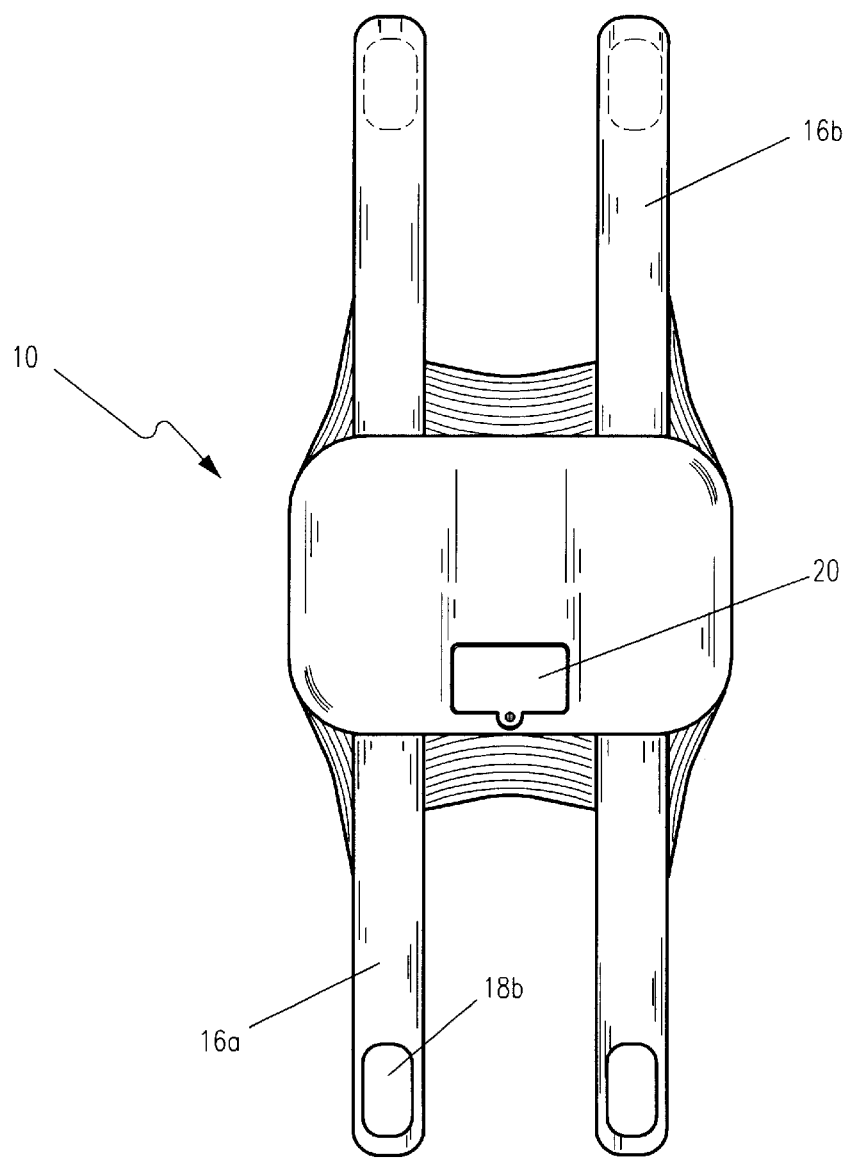
FIG. 2 is a rear plan view thereof.

Referring now to FIG. 2, it is envisioned that the rear of the cover 12 will have a smooth rear surface. An access cover 20 can thereby be incorporated for introduction of and access to internal lighting mechanisms and batteries.

Figure 3A:
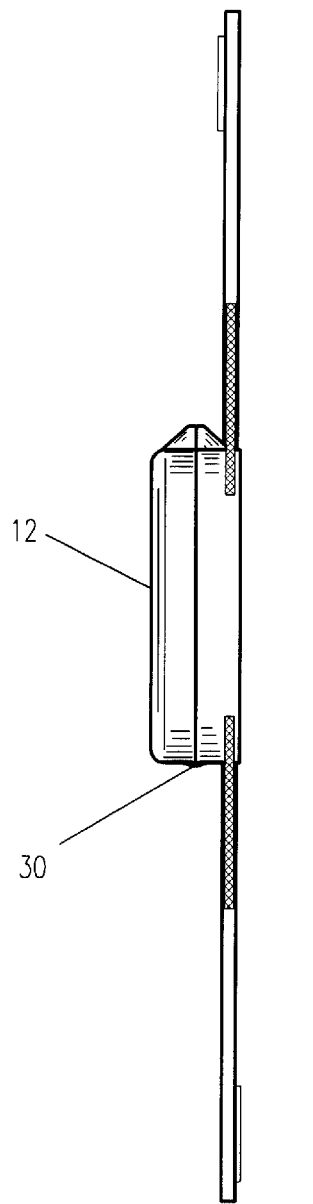
FIG. 3a and FIG. 3b are side elevational view thereof.
Figure 3B:
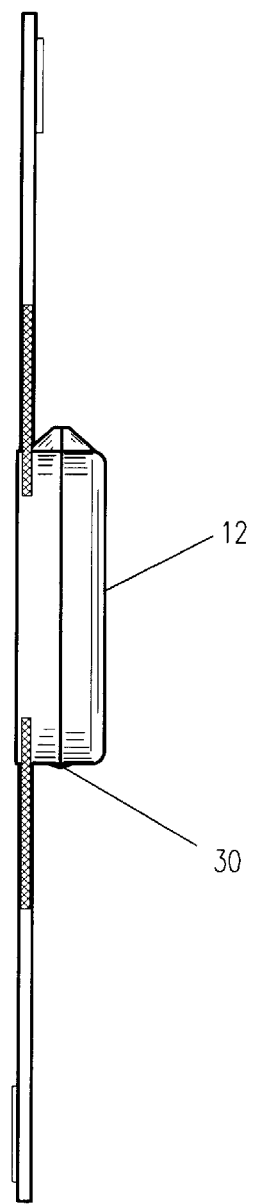

FIG. 3a and FIG. 3b depict the generally elongated nature of the cover 12. The cover 12 is shown in a closed condition utilizing a simple closure device 30 to hold it in place when the mirror 40 is not in use.

Figure 4:
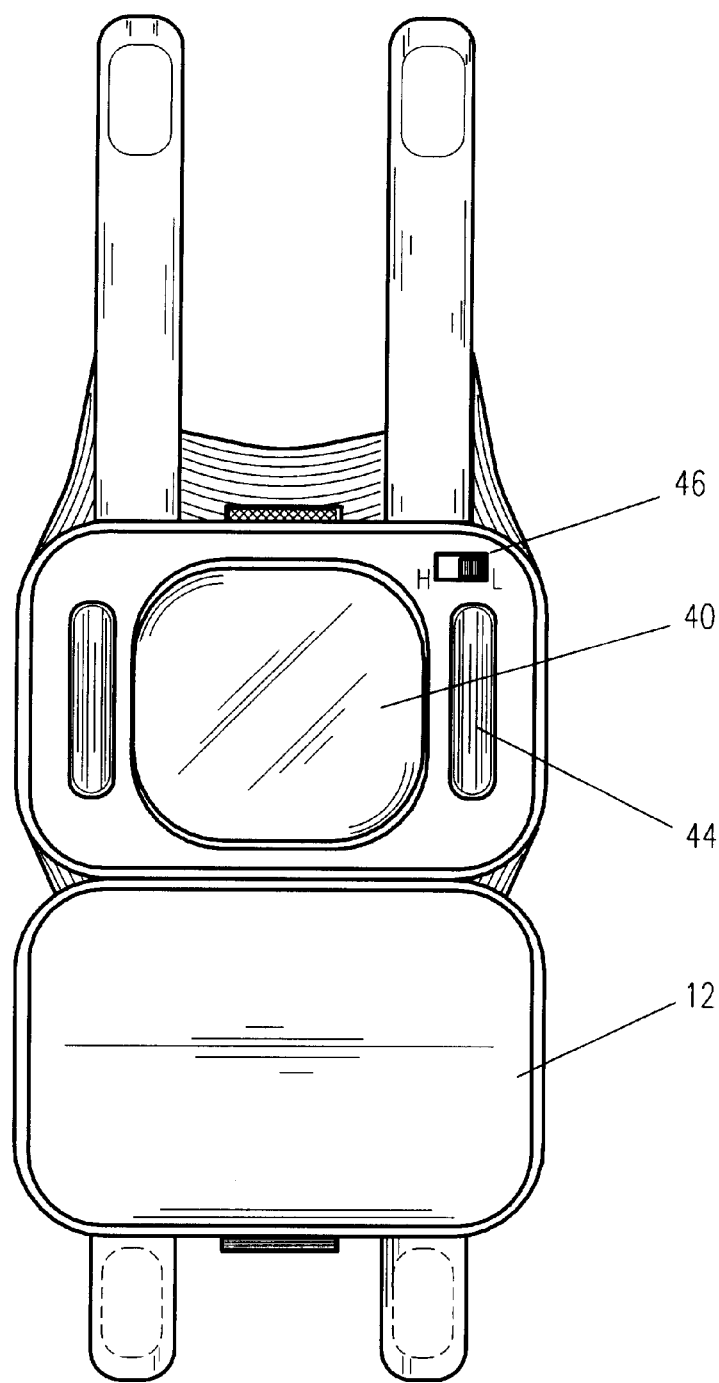
FIG. 4 is a front plan view of the embodiment depicted in FIG. 1 depicted in an opened condition.

Referring now to FIG. 4, the present invention consists of a reflective surface 40 contained within the easy open/close cover 12. The cover 12 uses a simple closure device 30 to hold it in place when the mirror 40 is not in use. Also included is a battery-powered illumination system 44. An on/off/dimmer control switch 46 lets the user to control the level of illumination.

Although it is envisioned that many different materials can be utilized in the production of the present invention, and further that no single particular selection of materials is necessary for the enablement of the present disclosure, the effective surface can easily be made of glass. However, since it is facing backseat passengers and is located near head level, the invention can be designed and constructed using a non-glass, reflective surface for safety considerations.

2. Operation of the Preferred Embodiment

Figure 5:
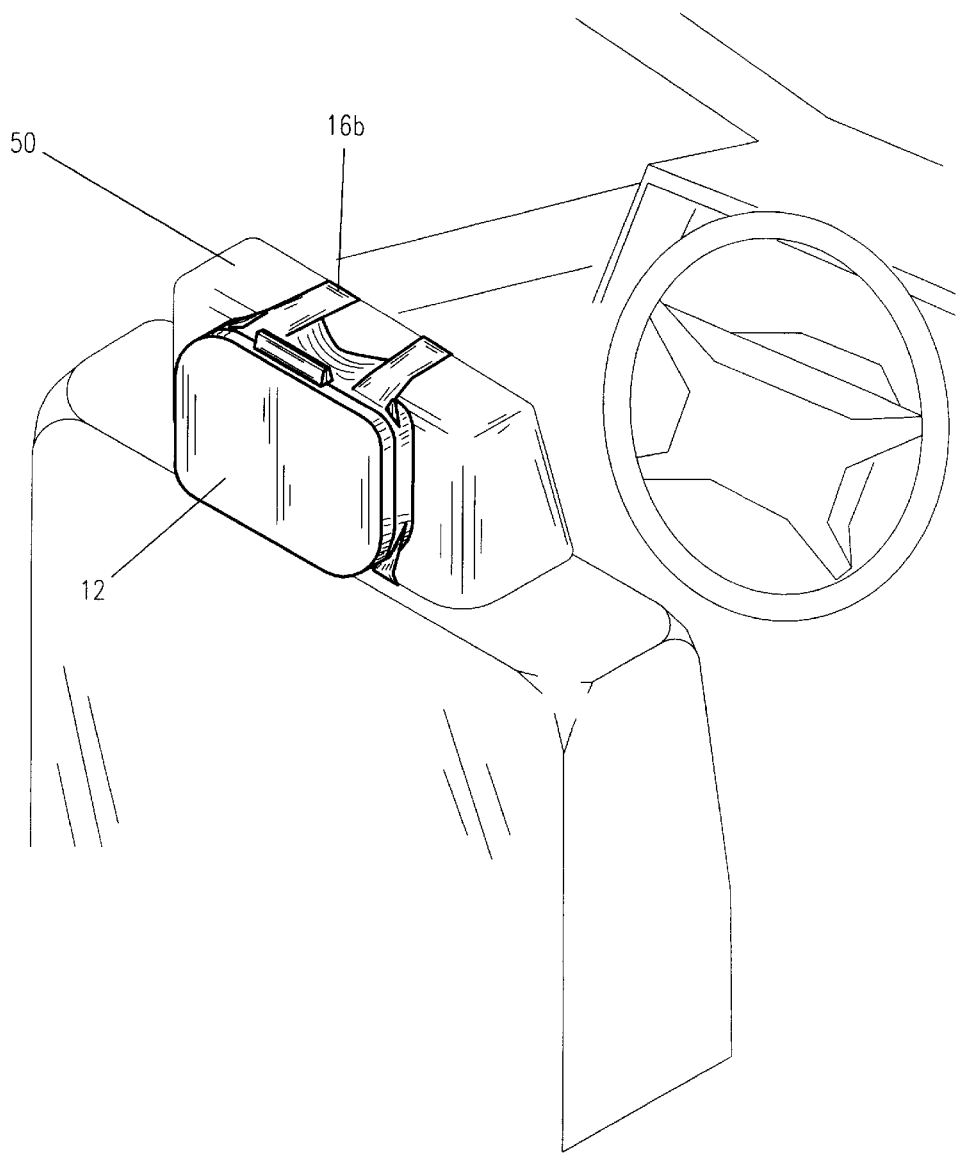
FIG. 5 is a perspective view thereof shown mounted to an automobile headrest.

To use the present invention in accordance with FIG. 5, using four straps, two short and two long, the harness 14 attaches to the front seat headrest 50 of an automobile or other motor vehicle. With the mirror compartment facing toward the back seat, the straps are connected with the aid of closure device. The two short straps 16a slip under the head rest 50 while the longer straps 16b wrap around the top. By attaching the present invention to a vehicle head rest, backseat passengers have access to a lighted vanity mirror. To operate, the user opens the protective cover 12 to reveal the reflective surface. If illumination is needed or desired, an on/off/dimmer switch can be activated to provide battery-powered lights.

The foregoing description is included to illustrate the operation of the preferred embodiment and is not meant to limit the scope of the invention. The scope of the invention is to be limited only by the following claims.

What is claimed is:

1. A combination automobile head rest mirror and harness attachment mechanism apparatus comprising:

a harness for or attachment to a seat headrest in a detachable, adaptable manner; wherein said harness comprises a plurality of opposed straps extending outward on the harness and away from the cover, and wherein said straps are of sufficient length as to be able to encompass and contain the headrest portion of an automobile vehicle seat;

an attachment means for securing said straps around said automobile vehicle seat headrest;

a cover, said cover affixed to the front of said harness;

a closure device for holding said cover in a closed position;

a reflective surface contained within said the cover; and a battery-powered illumination system for directing light outward from the face of said reflective surface.

2. The apparatus of claim 1, wherein said attachment means comprises hook and loop fastener.

3. The apparatus of claim 1, wherein said straps comprise:

a pair of long straps mounted in a manner parallel to one another; and a pair of short straps opposed to said long straps.

4. The apparatus of claim 1, further comprising:

a control switch for controlling the level of illumination.

5. The apparatus of claim 1, wherein said reflective surface is comprised of mirrored glass.

6. In a vanity mirror for use in and attachment to an automobile having a cover and a reflective surface contained within said the cover; and, wherein the improvement comprises:

a harness for or attachment to a seat headrest in a detachable, adaptable manner wherein said harness comprises a plurality of opposed straps extending outward on the harness and away from the cover, and wherein said straps are of sufficient length as to be able to encompass and contain the headrest portion of an automobile vehicle seat;

an attachment means for securing said straps around said automobile vehicle seat headrest;

a closure device for holding said cover in a closed position; and a battery-powered illumination system for directing light outward from the face of said reflective surface.

7. The apparatus of claim 6, wherein said attachment means comprises hook and loop fastener.

8. The apparatus of claim 6, wherein said straps comprise:

a pair of long straps mounted in a manner parallel to one another; and a pair of short straps opposed to said long straps.

9. The apparatus of claim 6, wherein the improvement further comprises:

a control switch for controlling the level of illumination.

* * * * *